United States Patent
Nam et al.

(10) Patent No.: US 11,438,838 B2
(45) Date of Patent: Sep. 6, 2022

(54) WAKE-UP UPLINK RESOURCE ASSIGNMENT FOR POWER-EFFICIENT C-DRX OPERATION

(71) Applicant: QUALCOMM Incorporated, San Diego, CA (US)

(72) Inventors: Wooseok Nam, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 135 days.

(21) Appl. No.: 16/786,587

(22) Filed: Feb. 10, 2020

(65) Prior Publication Data
US 2020/0260381 A1 Aug. 13, 2020

Related U.S. Application Data

(60) Provisional application No. 62/804,212, filed on Feb. 11, 2019, provisional application No. 62/804,206, filed on Feb. 11, 2019.

(51) Int. Cl.
H04W 52/02 (2009.01)
H04B 1/713 (2011.01)
H04W 24/10 (2009.01)
H04W 72/04 (2009.01)

(52) U.S. Cl.
CPC ........ *H04W 52/0225* (2013.01); *H04B 1/713* (2013.01); *H04W 24/10* (2013.01); *H04W 72/0413* (2013.01)

(58) Field of Classification Search
CPC ............. H04W 52/0225; H04W 24/10; H04W 72/0413; H04W 76/28; H04W 52/0219; H04W 52/0229; H04W 52/028; H04W 52/0216; H04B 1/713; Y02D 30/70
See application file for complete search history.

(56) References Cited

U.S. PATENT DOCUMENTS

| | | | | |
|---|---|---|---|---|
| 2018/0279274 A1* | 9/2018 | Sun | ........................ | H04L 1/1864 |
| 2019/0254110 A1* | 8/2019 | He | ........................ | H04L 5/0048 |
| 2019/0281546 A1* | 9/2019 | Lim | ................... | H04W 52/0216 |
| 2020/0029302 A1* | 1/2020 | Cox | ................... | H04W 56/0015 |
| 2020/0037247 A1* | 1/2020 | Liao | ................... | H04W 52/0219 |
| 2020/0383084 A1* | 12/2020 | Kim | ..................... | H04W 72/042 |

FOREIGN PATENT DOCUMENTS

WO 2018204799 A1 11/2018

OTHER PUBLICATIONS

International Search Report and Written Opinion—PCT/US2020/017679—ISA/EPO—dated May 29, 2020.
Qualcomm Incorporated: "Triggering Adaptation of UE Power Consumption Characteristics", 3GPP Draft, 3GPP TSG-RAN WG1 Meeting #94bis, R1-1811283, Triggering Mechanism for Adaptation, 3rd Generation Partnership Project (3GPP), Mobile Competence Centre, 650, Route Des Lucioles, F-06921, Sophia-Antipolis Cedex, France, vol. RAN WG1, No. Chengdu, China; Oct. 8, 2018-Oct. 12, 2018, Sep. 29, 2018 (Sep. 29, 2018), XP051518686, 12 pages, Retrieved from the Internet: URL: http://www.3gpp.org/ftp/tsg%5Fran/WG1%5FRL1/.

* cited by examiner

*Primary Examiner* — Steven H Nguyen
(74) *Attorney, Agent, or Firm* — Patterson & Sheridan, L.L.P.

(57) ABSTRACT

Certain aspects of the present disclosure provide techniques for assignment of shared uplink resources for uplink transmissions triggered by detection of a wake-up signal (WUS).

22 Claims, 13 Drawing Sheets

WAKE-UP UPLINK RESOURCE ASSIGNMENT FOR POWER-EFFICIENT C-DRX OPERATION

PRIORITY CLAIM(S)

This application claims priority to and the benefit of U.S. Provisional Application Nos. 62/804,206 and 62/804,212, both filed on Feb. 11, 2019, both of which are expressly incorporated by reference in their entirety as if fully set forth below and for all applicable purposes.

TECHNICAL FIELD

Aspects of the present disclosure relate to wireless communications, and more particularly, to techniques for assignment of shared resources for an uplink transmission after detection of a wake-up signal.

INTRODUCTION

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment (UE). The method generally includes obtaining information regarding uplink resources assigned to the UE for an uplink transmission during a wake-up procedure after detecting at least one wake up signal (WUS) during a WUS occasion configured for the UE in a discontinuous reception (DRX) mode, wherein the UE shares uplink resources with one or more other UEs for sending their own uplink transmissions after WUS detection and sending the uplink transmission, after detecting the WUS, using the assigned uplink resources.

Certain aspects provide a method for wireless communications by a network entity. The method generally includes signaling, to a user equipment, information regarding uplink resources assigned to the UE for an uplink transmission during a wake-up procedure after detecting at least one wake up signal (WUS) during a WUS occasion configured for the UE in a discontinuous reception (DRX) mode, wherein the UE shares uplink resources with one or more other UEs for sending their own uplink transmissions after WUS detection, sending the UE a WUS, and monitoring the assigned uplink resources for the uplink transmission, after sending the WUS.

Certain aspects of the present disclosure also provide various apparatus, means, and computer readable medium configured to perform (or cause a processor to perform) the operations described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
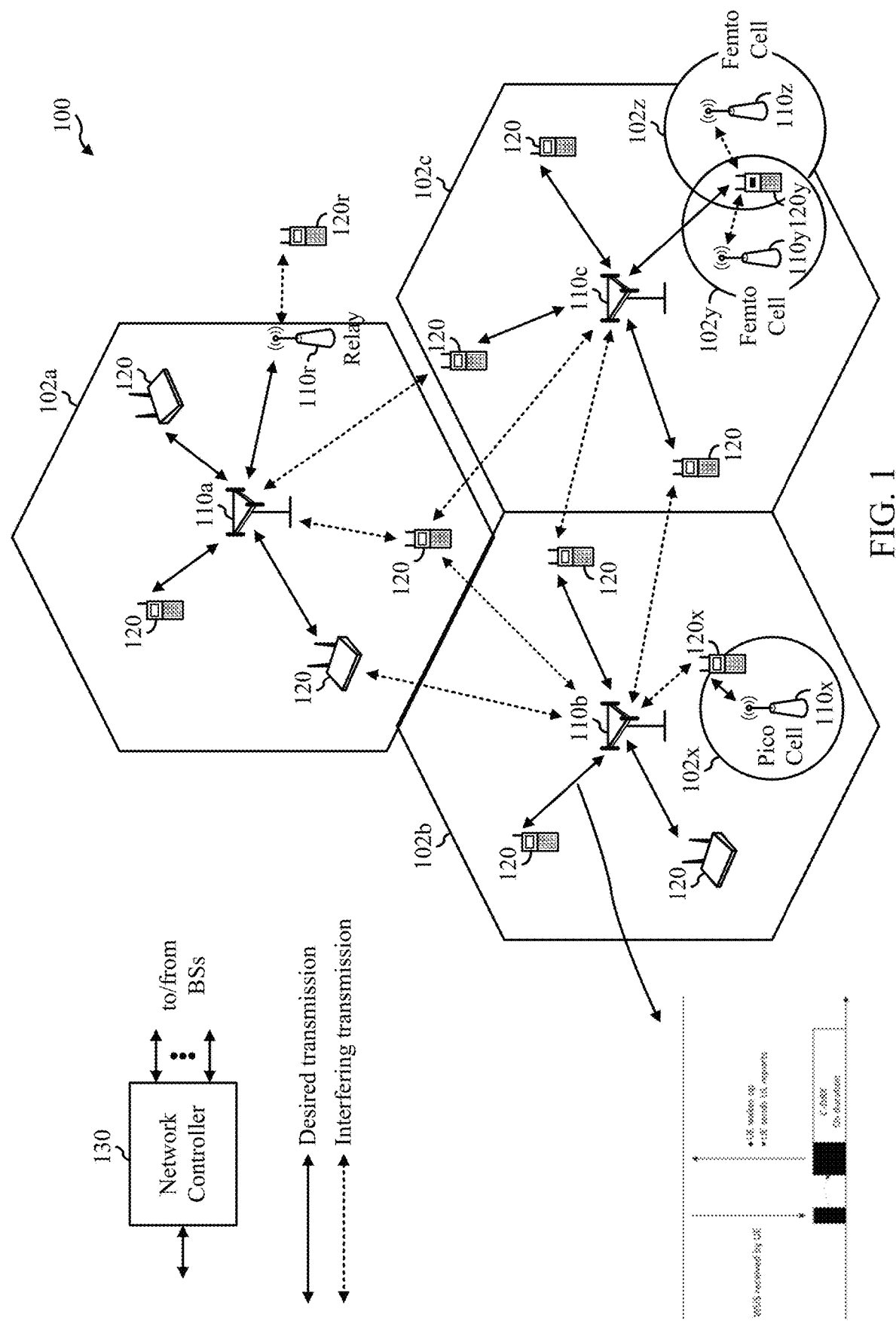
FIG. 1 is a block diagram conceptually illustrating an example telecommunications system, in accordance with certain aspects of the present disclosure.

Aspects of the present disclosure provide apparatus, methods, processing systems, and computer readable mediums for wake-up resource sharing techniques. For example, aspects of the present disclosure may allow for the assignment of shared resources for an uplink transmission after detection of a wake-up signal (WUS).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 (e.g., an NR/5G network, in which aspects of the present disclosure may be performed.

For example, as illustrated, a base station 110b may send a WUS to a UE 120 to trigger an uplink transmission (e.g., to send feedback or report some information). The uplink transmission may be sent using uplink resources shared between a number of different UEs. Aspects of the present disclosure may allow the uplink resources to be assigned in a manner that a UE, upon detecting a WUS, is able to determine assigned uplink resources without additional signaling overhead, thus allowing faster response time.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
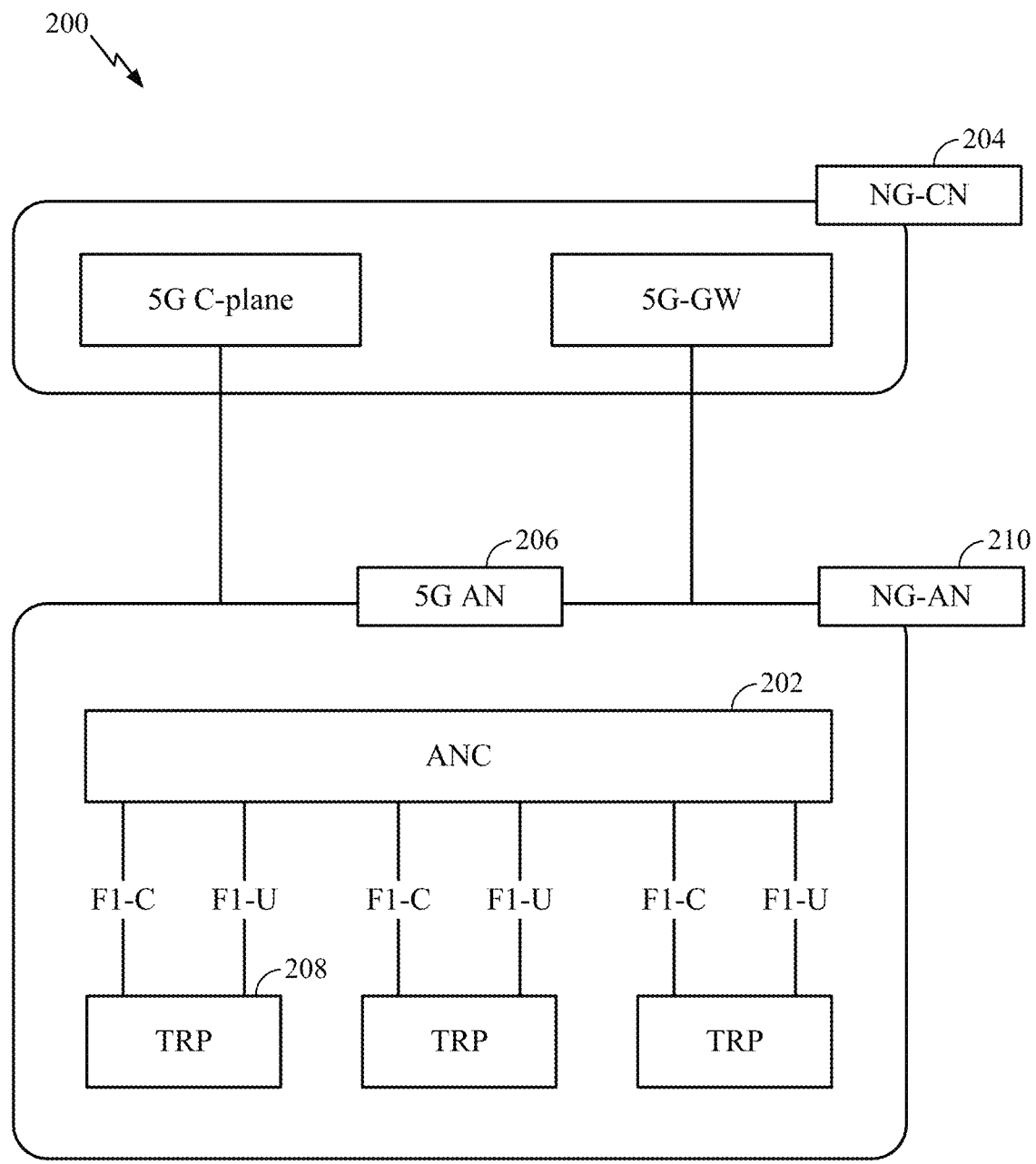
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
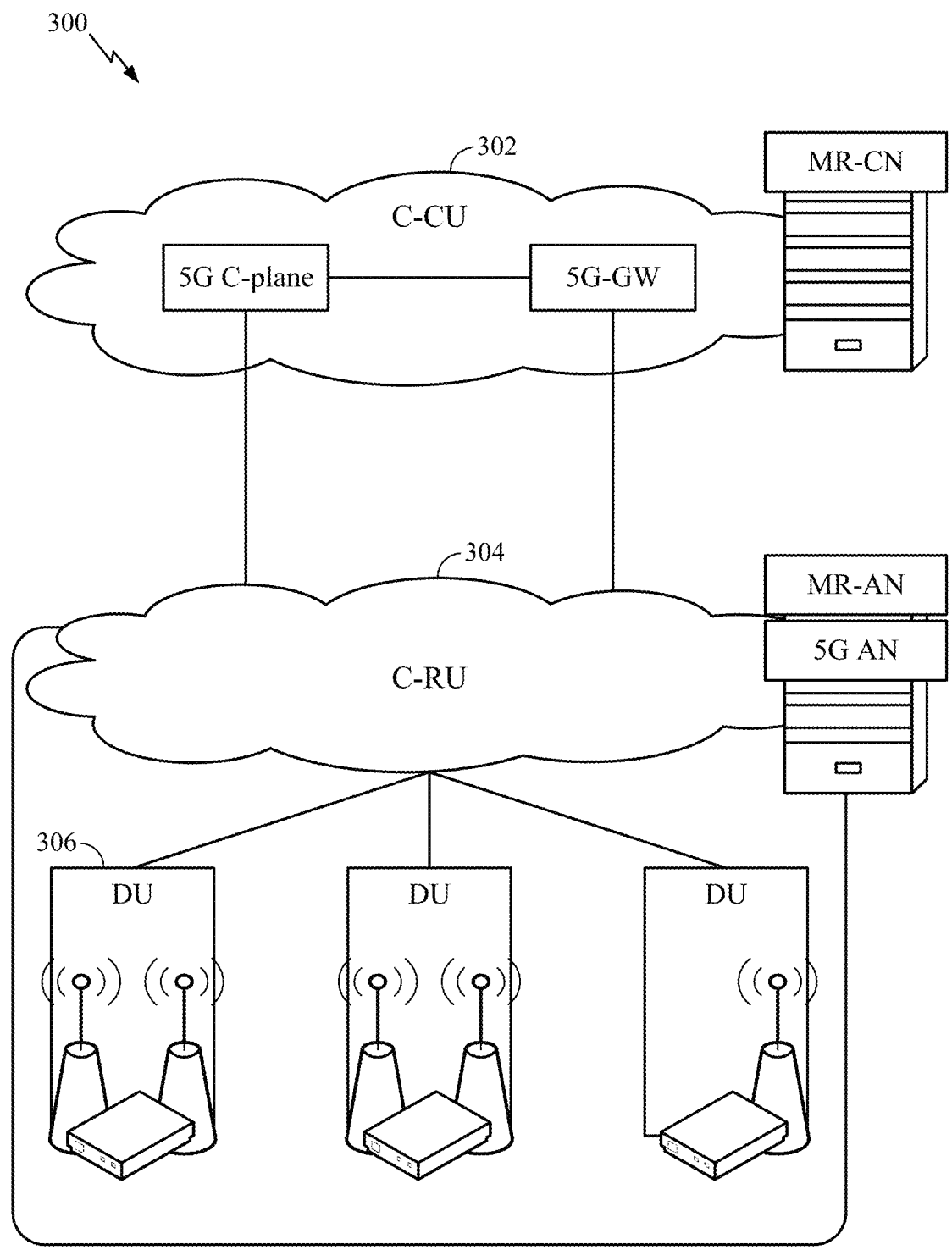
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
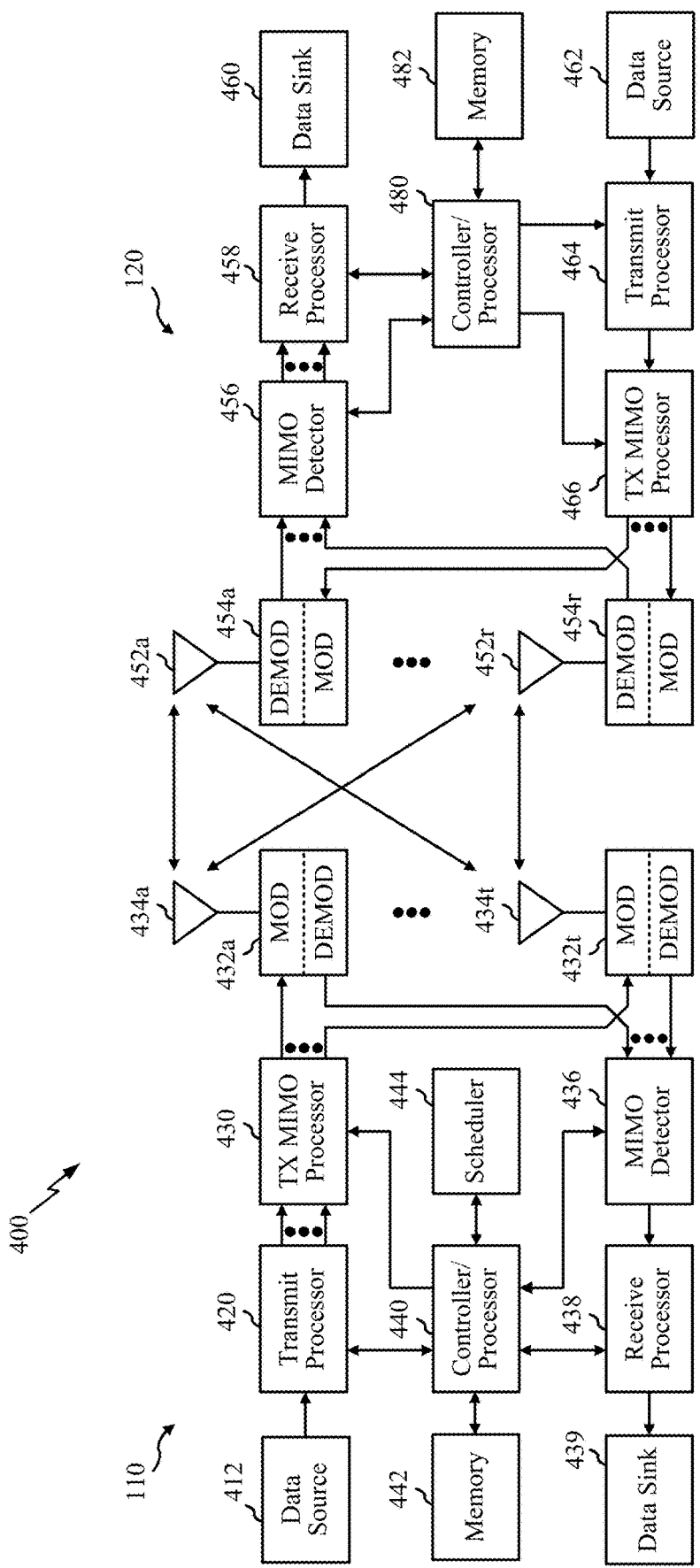
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
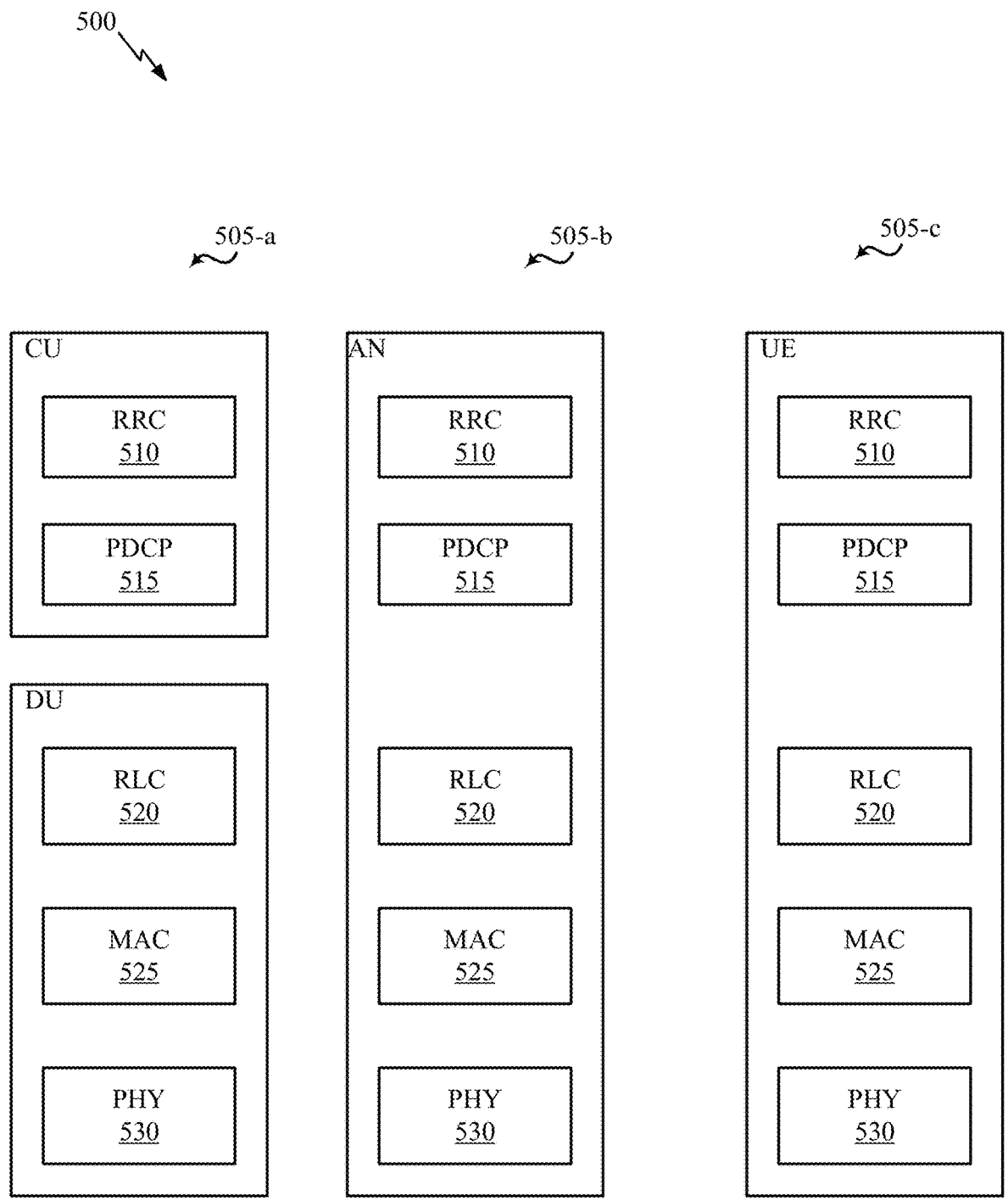
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
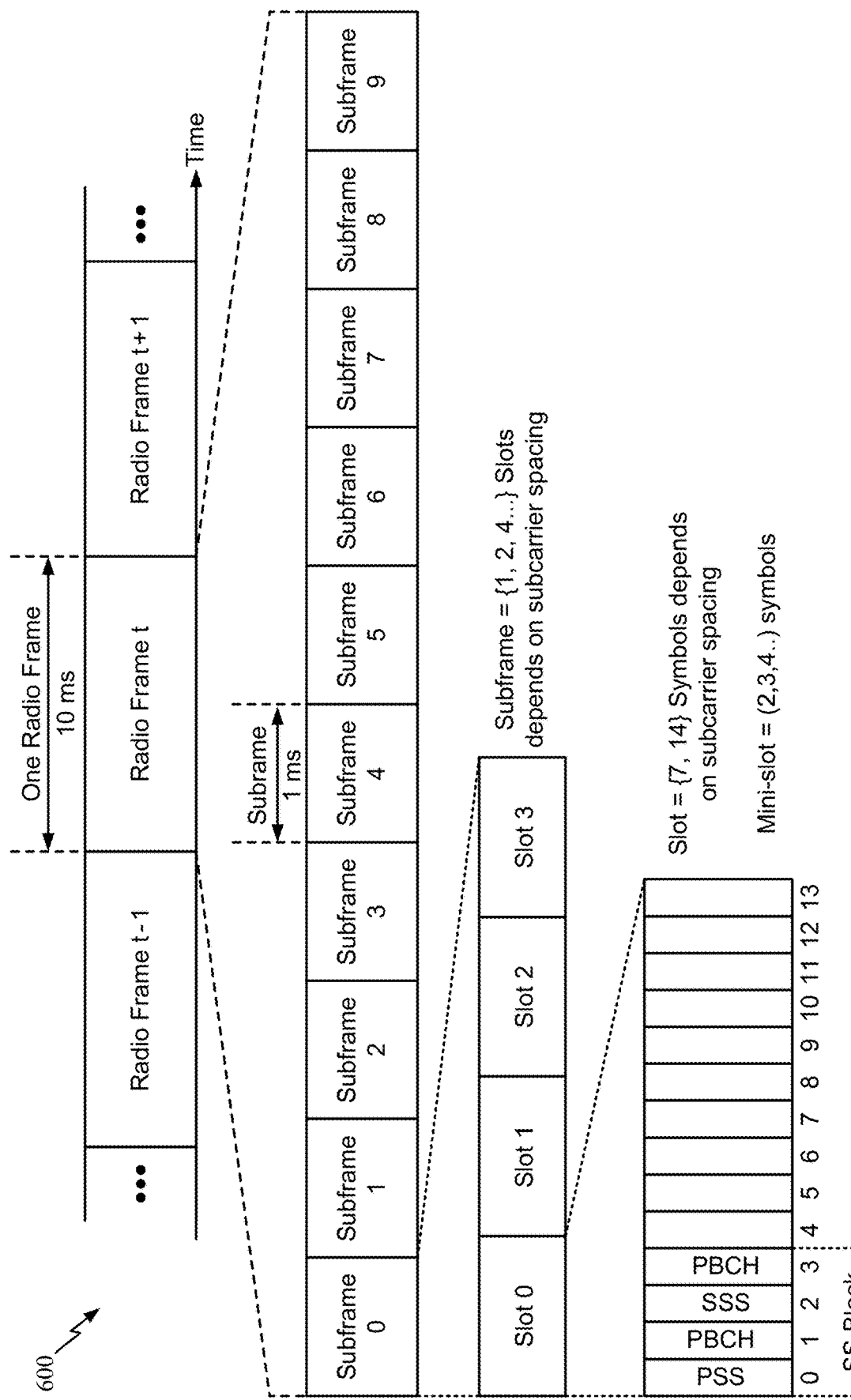
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block may be transmitted up to sixty-four times, for example, with up to sixty-four different beam directions for mmW. The up to sixty-four transmissions of the SS block are referred to as the SS burst set.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example C-DRX with Beamforming and Wake-Up Signals

Figure 7:
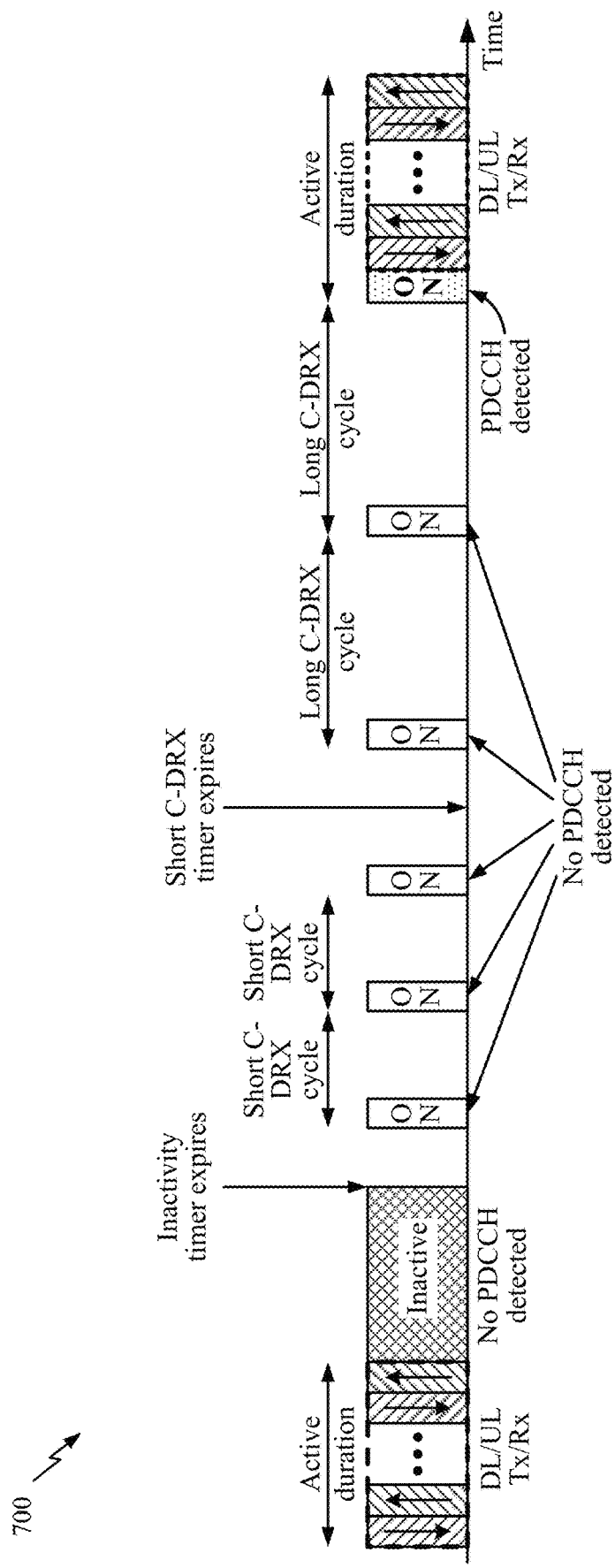
FIG. 7 illustrates connected discontinuous reception (C-DRX) operations, in which aspects of the present disclosure may be practiced.

As illustrated in FIG. 7, during periods of traffic inactivity, UE may switch to C-DRX operation for power saving. A UE may be configured for C-DRX according to various configuration parameters, such as an inactivity timer, short DRX timer, short DRX cycle, and long DRX cycle.

As illustrated in FIG. 7, based on configured cycles, UE wakes up occasionally for ON durations and monitors for PDCCH transmissions. Except for ON durations, the UE may remain in a low power (sleep) state referred to as an OFF duration, for the rest of C-DRX cycle. During the OFF duration, the UE is not expected to transmit and receive any signal.

As illustrated, the UE may wake-up at a termination of C-DRX mode. For example, if the UE detects a PDCCH scheduling data during an ON duration, UE remains on to transmit and receive data. Otherwise, the UE goes back to sleep at the end of the ON duration.

Figure 8:
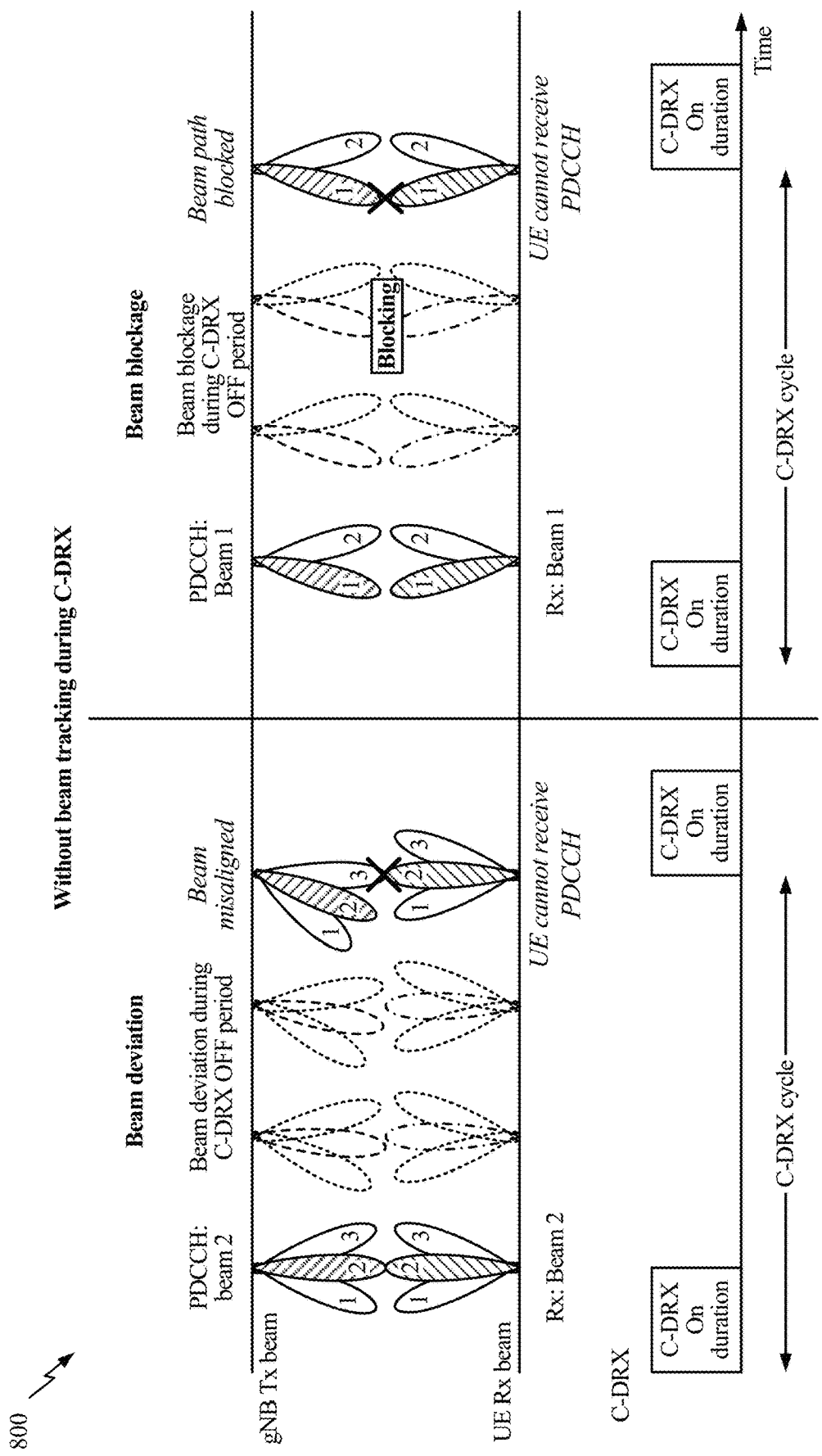
FIG. 8 illustrates C-DRX with beamforming, in which aspects of the present disclosure may be practiced.

As illustrated in FIG. 8, in some cases, to enhance possibility or reaching the UE, beamforming may be used with C-DRX. While beamforming may enhance communications, it is not without challenges. For example, without beam tracking, beam pairs may degrade during C-DRX OFF period. The longer the C-DRX cycle, the more vulnerable transmissions are to beam degradation. While shorter C-DRX cycles may be less prone to beam degradation, shorter periods suffer from a power consumption penalty.

As illustrated in FIG. 8, due beam deviation by UE orientation change or mobility (or beam blocking or MPE, etc.), a UE may not be able to receive PDCCH in the beginning of the next C-DRX ON duration and fail to wake-up.

In some cases, sleep (OFF) durations may be extended using wake-up signals (WUS). The general principle of WUS in C-DRX is illustrated in FIG. 9.

As illustrated, in the time period before a C-DRX on duration, only a wake-up subsystem is turned on for WUS decoding (while the main modem is not powered on). The wake-up subsystem is typically a low complexity receiver (e.g., a simple correlator) using lower power than PDCCH decoding. The WUS may be a special waveform, such as special tone, preamble, reference-signal, or the like. Additionally, there may be different types of WUS, such as a reference-signal-type WUS and a PDCCH-type WUS. Reference-signal-type WUSs may include reference signals such as channel state information reference signals (CSI-RS), tracking reference signal (TRS), and DMRS. In some cases, PDCCH-type WUSs may use an existing DCI format or new compact DCI format.

Figure 9:
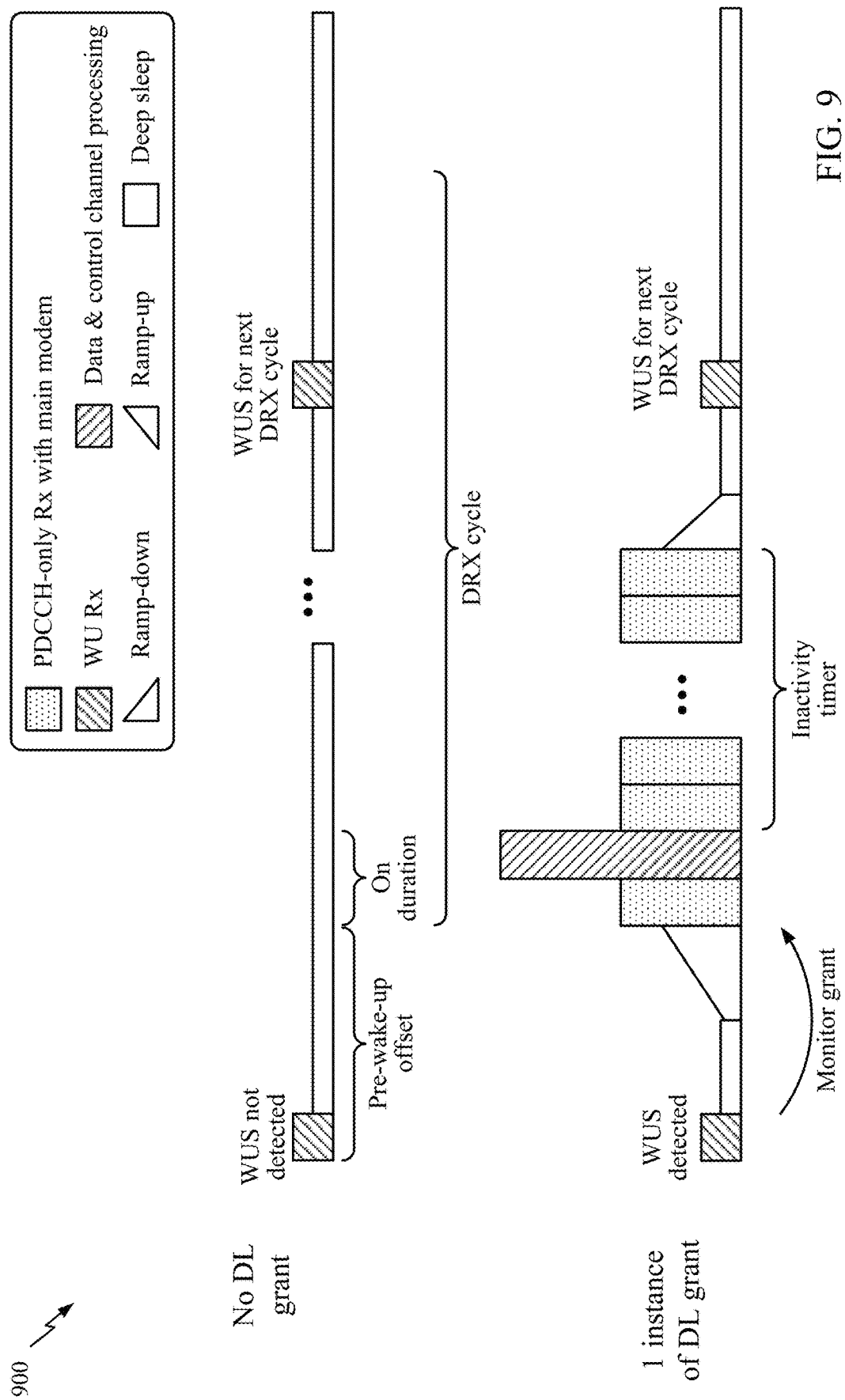
FIG. 9 illustrates example C-DRX with wake-up signals (WUS), in which aspects of the present disclosure may be practiced.

As illustrated in FIG. 9, only when WUS is detected, the UE wakes-up the full modem for the next ON duration. Otherwise, UE skips ON duration and goes back to sleep until the next C-DRX cycle.

WUS can either be group-specific or UE-specific. For example, with group-specific WUS, a group of UEs may share the same wake-up signal and/or signaling occasions. A benefit if this approach is low network overhead, but at the expense of some UEs possibly being woken up even when there is no data. With UE-specific WUS, on the other hand, each UE has a dedicated wake-up signal and/or WUS signaling occasions. While this approach has a larger network overhead (when compared to group-specific WUS), it may be more flexible and efficient in terms of UE power saving.

In some cases, while C-DRX configurations are UE-specific, multiple UEs in the cell may share the same C-DRX configuration (e.g., C-DRX cycle, ON duration offset) in practice. Sharing the same C-DRX configurations may be beneficial from NW resource/power saving perspective.

For UEs sharing the same C-DRX, WUS may be either UE-specific or scrambling sequence. For example, for UE-specific WUS, each UE may be configured with a dedicated WUS (i.e. dedicated resource, sequence, format, scrambling, etc.). Additionally, for scrambling sequence WUS, a group of UEs may share the same WUS. Further, regardless of whether the WUS is UE-specific or scrambling sequence, each UE performs WUS detection within the assigned WUS resource.

Example Uplink Resource Assignment for Power Efficient C-DRX Operation

As described above, wake-up signals (WUS) may be used to improve power efficiency during C-DRX operation. In some cases, the WUS may be used to wake a UE up for an uplink transmission.

Figure 10:
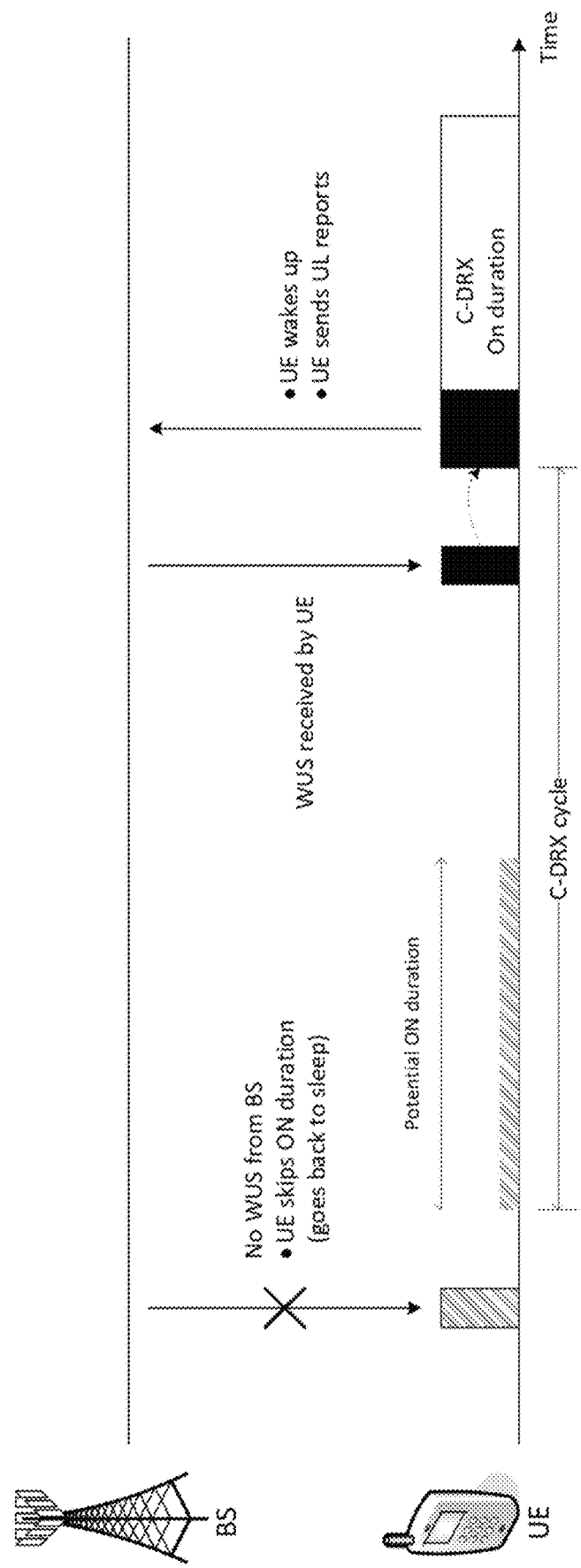
FIG. 10 illustrates example C-DRX with a WUS to trigger an uplink transmission using shared resources assigned in accordance with aspects of the present disclosure.

For example, as illustrated in FIG. 10, a base station may send a WUS to a UE to trigger uplink reporting. The reporting may be of channel state information feedback or the reporting may be to acknowledge the WUS.

Use of the WUS may help reduce power consumption by allowing the UE to reduce the chance of unnecessarily waking-up, for example, when there is no data schedule for the UE during the ON duration. In such cases, if a WUS is not detected, the UE may go back to sleep. As noted above, there may be different types of signaling options for the WUS, such as CSI-RS, TRS, DMRS, PDCCH-type, or sequence-type signaling (e.g., using pseudo-random number PN sequences or Zaddoff Chu ZC sequences).

As noted above, the WUS may be sent using downlink resources shared between a number of different UEs. In some cases, uplink resources used for an uplink transmission triggered by the WUS may also be shared between a number of different UEs.

Aspects of the present disclosure may allow such shared uplink resources to be assigned in a manner that a UE, upon detecting a WUS, is able to quickly and efficiently determine assigned uplink resources without additional signaling overhead. As a result, the techniques presented herein may allow a UE to efficiently send an uplink transmission with reduced turnaround and promptly transitioning to an active mode of operation.

Figure 11:
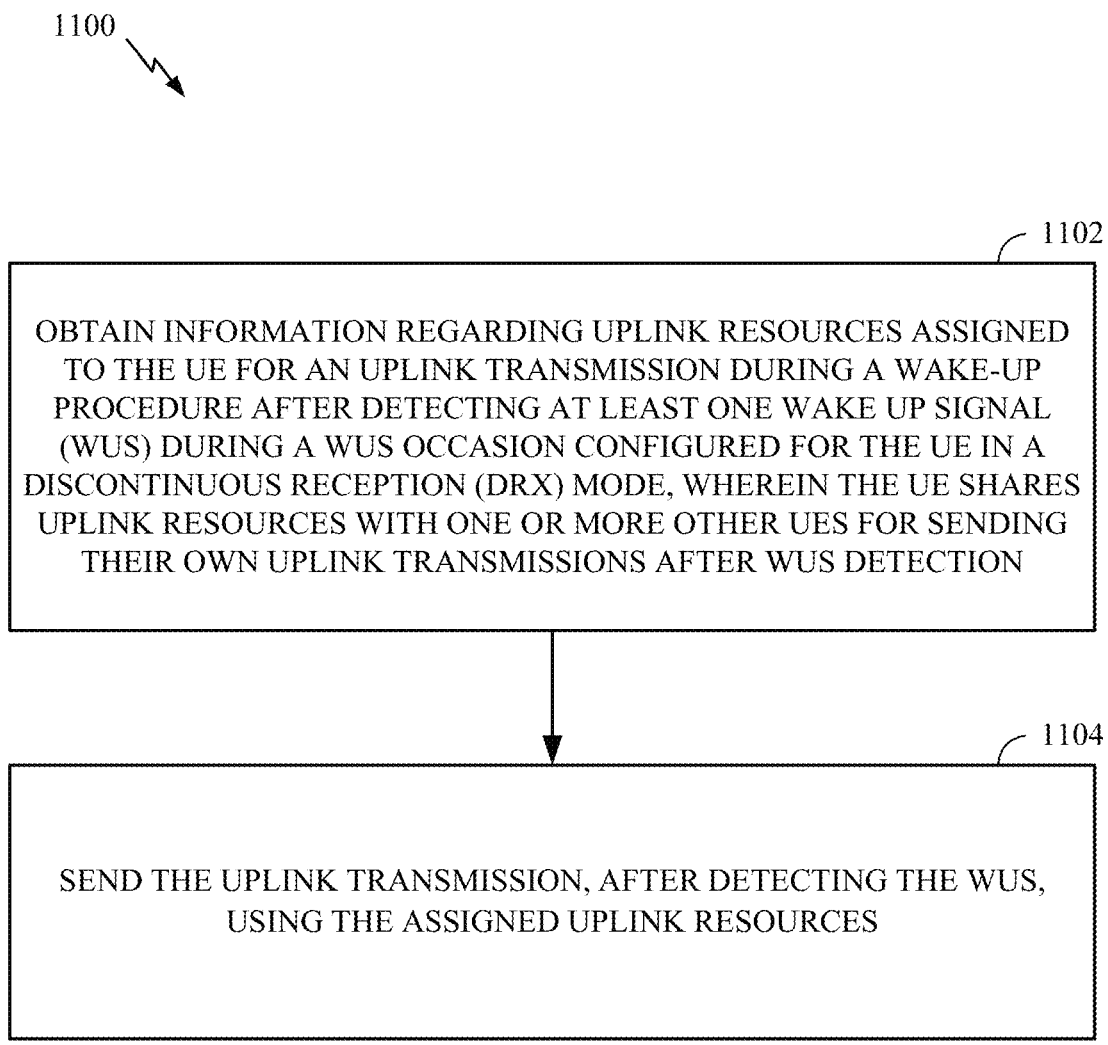
FIG. 11 illustrates example operations for wireless communications by a user equipment, in accordance with certain aspects of the present disclosure.

FIG. 11 illustrates example operations 1100 for wireless communications in a network by a UE. Operations 1100 may be performed, for example, by a UE (e.g., 120 of FIG. 1 or FIG. 4) for monitoring for WUSs (transmitted during an OFF duration of a DRX mode at the UE) to trigger uplink reporting by the UE.

According to aspects, the UE may include one or more components as illustrated in FIG. 4 which may be configured to perform the operations described herein. For example, the antenna 452, demodulator/modulator 454, controller/processor 480, and/or memory 482 as illustrated in FIG. 4 may perform the operations described herein.

Operations 1100 begin, at 1102, by obtaining information regarding uplink resources assigned to the UE for an uplink transmission during a wake-up procedure after detecting at least one wake up signal (WUS) during a WUS occasion configured for the UE in a discontinuous reception (DRX) mode, wherein the UE shares uplink resources with one or more other UEs for sending their own uplink transmissions after WUS detection.

At 1104, the UE sends the uplink transmission, after detecting the WUS, using the assigned uplink resources.

Figure 12:
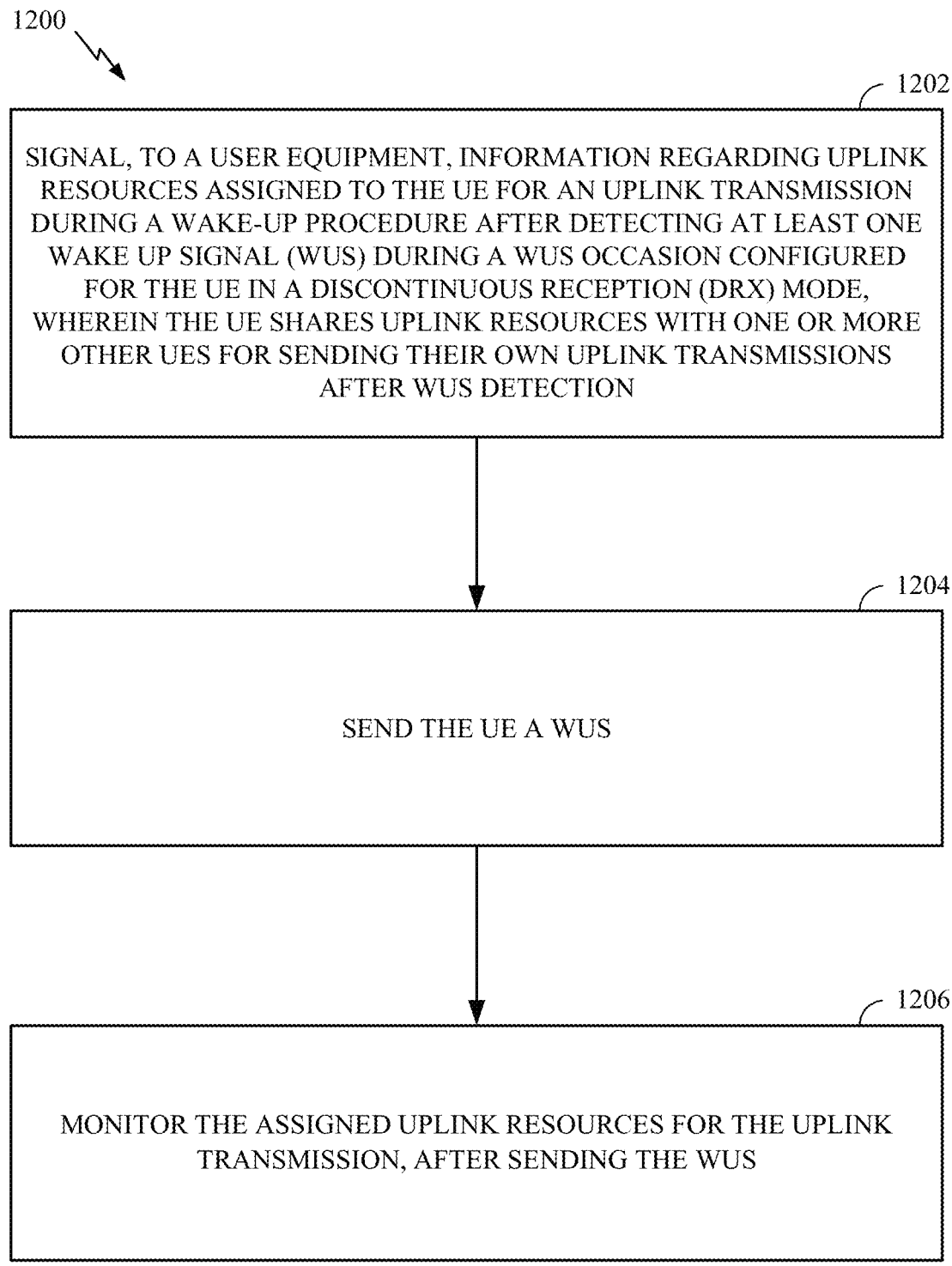
FIG. 12 illustrates example operations for wireless communications by a network entity, in accordance with certain aspects of the present disclosure.

FIG. 12 illustrates example operations 1200 for wireless communications by a network entity. Operations 1200 may be considered complementary to operations 1100 of FIG. 11 and may be performed, for example, by a base station/gNB to assign shared uplink resources for a UE (performing operations 1100) to transmit an uplink report triggered by a WUS transmission.

According to aspects, the network entity (e.g., some type of BS) may include one or more components as illustrated in FIG. 4 which may be configured to perform the operations described herein. For example, the antenna 434, demodulator/modulator 432, controller/processor 440, and/or memory 442 as illustrated in FIG. 4 may perform the operations described herein.

Operations 1200 begin at 1202 by signaling, to a UE, information regarding uplink resources assigned to the UE for an uplink transmission during a wake-up procedure after detecting at least one wake up signal (WUS) during a WUS occasion configured for the UE in a discontinuous reception (DRX) mode, wherein the UE shares uplink resources with one or more other UEs for sending their own uplink transmissions after WUS detection.

At 1204, the network entity sends the UE a WUS and, at 1206, monitors the assigned uplink resources for the uplink transmission, after sending the WUS.

The power-efficient wake-up procedure presented herein may be used to assign resources for uplink transmissions triggered by a WUS. As noted above, the uplink transmissions may be, for example, for the collection of uplink reports (e.g., channel or acknowledgment feedback) from one or multiple UEs addressed (awakened) by the WUS.

As described above, there is typically a tradeoff between the amount of resource sharing, signaling overhead, and flexibility. For example, while UE-specific (dedicated) UL resource assignment may allow more flexibility, it also requires additional signaling. On the other hand, while group-specific UL resource assignment may reduce signaling overhead it allows for less flexibility.

As illustrated in FIG. 10, in some cases, the triggered report may be sent in the CDRX ON duration (e.g., at a beginning of the CDRX ON duration to reduce reporting turnaround time). In other cases, the triggered report may be sent between the end of the WUS occasion and the start of the ON duration (further reducing reporting turnaround time).

There are various possible purposes (content) of the UL reporting. For example, the UE may send the report to acknowledge (confirm successful detection/reception) of the WUS to the BS to avoid error cases. This may also help address misdetection events, for example, allowing the network to know if a UE was not able to detect a WUS or if a UE that was not targeted by a WUS erroneously detected a WUS (a false positive).

In some cases, channel measurement reports may be sent, for example, as CSI, which may include channel quality indicator (CQI), precoding matrix indicator (PMI), rank indication (RI), or the like. In some cases, the channel measurement report may include layer 1 (L1 or Physical layer) reference signal reciv L1-RSRP (e.g., single group L=1 beam management) reporting. In such cases, the UE may measure CSI or L1-RSRP during a C-DRX OFF period (e.g., using SS/PBCH blocks). In some cases, measurements may be based on CSI-RS transmitted along with WUS.

In some cases, it may be up to the UE to decide whether or not to send an uplink transmission using the assigned resources. For example, if a reported measurement parameter has not changed sufficiently (e.g., beyond a threshold value), the UE may not send a report. In such cases, the network may assume the previous value has not changed (or has not changed significantly).

In some cases, the UE may use the assigned UL resources to send a request for additional reference signals, such as aperiodic RSs (e.g., A-CSI-RS or A-TRS). In some cases, the UE may use the assigned UL resources to send reference signals itself, such as sounding reference signal (SRS) transmissions. SRS transmissions may help achieve fast UL synchronization recovery and may also speed up CSI-acquisition, based on DL-UL channel reciprocity.

In some cases, the UE may use the assigned resources for status reporting. For example, the UE may use the assigned resources to send a power headroom report (PHR) that indicates whether or not the UE can transmit at a higher transmission power. As another example, the UE may use the assigned resources to send a buffer status report (BSR) indicating the UE has data to be sent out (and how much).

There are various options for the type of wake-up uplink (WU-UL) resources assigned to a UE for an uplink transmission triggered by a WUS. In some cases, the type of assignment may depend on size of payload the UE has to report. For example, a UE may be assigned a (short or long) PUCCH if the UE has a relatively small UL reporting payload. On the other hand, the UE may be assigned a (grant free) PUSCH if the UE has a relatively large UL reporting payload.

In some cases, the UL resource assignment may be sequence-based. For example, similar to SRS configurations, a UE may be assigned resources for sequence transmission. In such cases, reporting payload may be encoded in the Tx tone location, cyclic-shift, or root-selection for the sequence.

Various techniques may be used to enable multiplexing of different UEs using shared WU-UL resources. In some cases, frequency, time, and/or spatial resource mapping rules may be used. In such cases, orthogonal (e.g., non-overlapping) frequency-time resources may be assigned to different UEs. In some cases, different spatial layers or beams may be assigned to different UEs (e.g., in UL scenarios). In some cases, different spreading codes, root sequences, or cyclic-shift values may be assigned to different UEs.

There may be a limit on a duration of how long a UE may use the assigned resources (e.g., the assignment may be valid for a limited time). For example, the WU-UL resource allocation may only be valid during the wake-up procedure. In such cases, although a similar format may be used, the PUCCH/PUSCH resources for WU-UL may be different from the PUCCH/PUSCH resources configured for the UE for normal (e.g., non CDRX active-time) operation.

In some cases, assigned UL resources may not vary in time. In such cases, the fixed WU-UL resources may be UE-specifically configured, for example, via RRC or MAC CE signaling. In other cases, UL resources assigned to a UE may vary in time. For example, the WU-UL resource may change with the particular DL resources used for the associated WUS.

Figure 13:
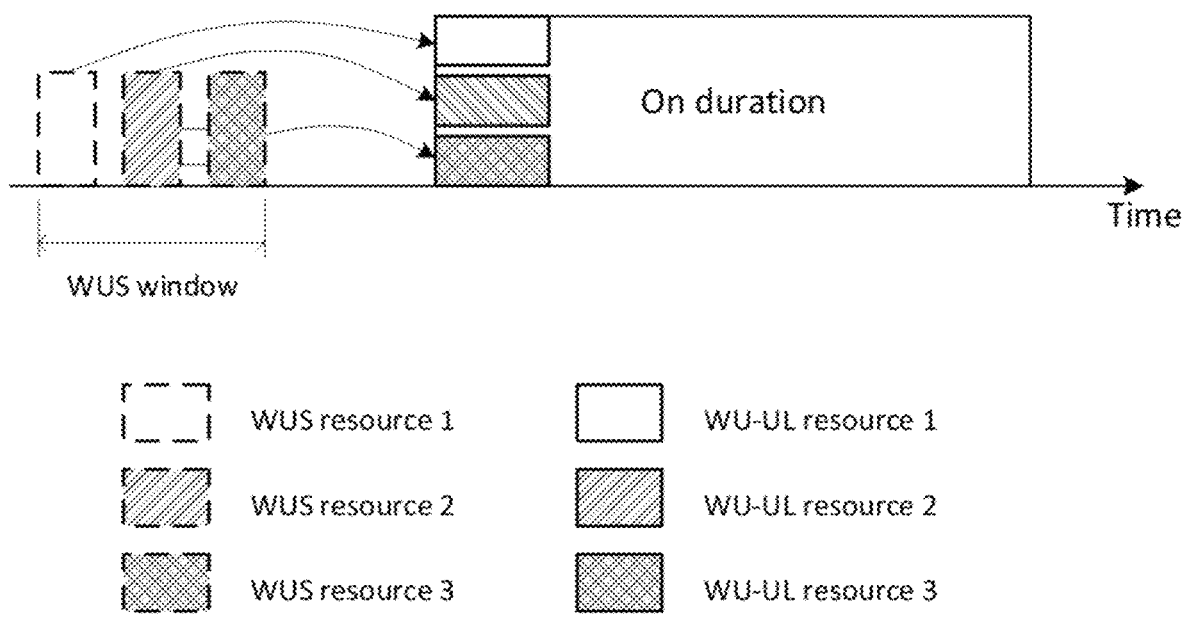
FIG. 13 illustrates an example mapping of downlink resources used for a WUS to uplink resources assigned for an uplink transmission triggered by the WUS, in accordance with aspects of the present disclosure.

For example, FIG. 13 illustrates an example association (mapping) of downlink resources (shown with dashed lines) used for a WUS to uplink resources (shown with solid lines) assigned for an uplink transmission triggered by the WUS, in accordance with aspects of the present disclosure.

For illustrative purposes only, the example in FIG. 13 shows 3 WUS resources (within a WUS window) that are orthogonal in time that map to three different WU-UL resources that are orthogonal in frequency. Thus, according to this example, a UE would monitor each WUS resource (e.g., attempting a blind decode of each candidate location) and determine the UL resources, based on which resource WUS is actually detected and the illustrated mapping. In other words, if the UE detects WUS in WUS resource 1, it would use WU-UL resource 1 for the corresponding UL transmission.

Other types of mappings are also possible, for example, with a mapping of different WUS resources orthogonal in frequency to different WU-UL resources orthogonal in time, a mapping of different WUS resources orthogonal in frequency to different WU-UL resources orthogonal in frequency, or a mapping of different WUS resources orthogonal in time to different WU-UL resources orthogonal in time.

In some cases, a base station may use the actual WUS transmission to indicate assigned UL resources. For example, the actual WUS transmission may indicate (e.g., in its payload) the resources for its associated WU-UL transmission.

In some cases, WU-UL resources may (autonomously/automatically) change based on (configurable) frequency-time hopping patterns. For example, a base station may provide the hopping pattern as part of a configuration. In some cases, the base station may provide a set of hopping patterns and, subsequently, provide signaling indicating one of the hopping patterns in the set to use.

In some cases, WU-UL resources may change according to a combination of the techniques described above. For example, the WU-UL resources may change based on any combination of a mapping of WUS resources to WU-UL resources, the WUS transmission and/or frequency hopping pattern.

Aspects of the present disclosure provide techniques for UL resource assignment for UL transmission triggered by detection of a WUS. The techniques presented herein may provide flexibility in resource assignment, with relatively low signaling overhead. As a result, the techniques may help achieve fast UL reporting turnaround, which may allow a UE to promptly transition to an active mode of operation.

EXAMPLE EMBODIMENTS

Embodiment 1

A method of wireless communication by a user equipment (UE), comprising obtaining information regarding uplink resources assigned to the UE for an uplink transmission during a wake-up procedure after detecting at least one wake up signal (WUS) during a WUS occasion configured for the UE in a discontinuous reception (DRX) mode, wherein the UE shares uplink resources with one or more other UEs for sending their own uplink transmissions after WUS detection and sending the uplink transmission, after detecting the WUS, using the assigned uplink resources.

Embodiment 2

The method of Embodiment 1, wherein the uplink transmission is sent between an end of the WUS and a start of an ON duration of the DRX mode or during the ON duration.

Embodiment 3

The method of any of Embodiments 1-2, wherein the uplink transmission is sent to at least one of: confirm detection of the WUS, provide feedback regarding measurement of one or more reference signals (RS), or request one or more types of RS.

Embodiment 4

The method of any of Embodiments 1-3, wherein the uplink transmission comprises at least one of sounding reference signals (SRS) or UE status reporting.

Embodiment 5

The method of any of Embodiments 1-4, wherein the assigned uplink resources are for a physical uplink control channel (PUCCH) transmission or a physical uplink shared channel (PUSCH) transmission.

Embodiment 6

The method of any of Embodiments 1-5, wherein the UE shares uplink resources with the one or more other UEs for sending their own uplink transmissions after WUS detection via at least one of: assignment of orthogonal frequency time uplink resources to different UEs, different spatial layers or beams assigned to different UEs, or different spreading codes, root sequences, or cyclic shift values assigned to different UEs.

Embodiment 7

The method of any of Embodiments 1-6, wherein the information regarding uplink resources assigned to the UE is obtained via at least one of radio resource control (RRC) or media access control (MAC) control element (CE) signaling.

Embodiment 8

The method of any of Embodiments 1-7, wherein the uplink resources assigned to the UE vary.

Embodiment 9

The method of Embodiment 8, wherein the uplink resources assigned to the UE: vary depending on the resources used for transmission of the WUS, are indicated by the WUS, or vary according to a frequency hopping pattern.

Embodiment 10

The method of Embodiment 9, wherein the UE determines the uplink resources assigned to the UE based on a mapping of the resources used for transmission of the WUS and uplink resources assigned to the UE.

Embodiment 11

A method of wireless communication by a network entity, comprising signaling, to a user equipment, information regarding uplink resources assigned to the UE for an uplink transmission during a wake-up procedure after detecting at least one wake up signal (WUS) during a WUS occasion configured for the UE in a discontinuous reception (DRX) mode, wherein the UE shares uplink resources with one or more other UEs for sending their own uplink transmissions after WUS detection, sending the UE a WUS, and monitoring the assigned uplink resources for the uplink transmission, after sending the WUS.

Embodiment 12

The method of Embodiment 11, wherein the assigned resources are for the uplink transmission to be sent between an end of the WUS and a start of an ON duration of the DRX mode or during the ON duration.

Embodiment 13

The method of any of Embodiments 11-12, wherein the uplink transmission provides at least one off confirmation of detection of the WUS, feedback regarding measurement of one or more reference signals (RS), or a request one or more types of RS.

Embodiment 14

The method of any of Embodiments 11-13, wherein the uplink transmission comprises at least one of sounding reference signals (SRS) or UE status reporting.

Embodiment 15

The method of any of Embodiments 11-14, wherein the assigned uplink resources are for a physical uplink control channel (PUCCH) transmission or a physical uplink shared channel (PUSCH) transmission.

Embodiment 16

The method of any of Embodiments 11-15, wherein the network entity multiplexes uplink resources for the UE and the one or more other UEs for sending their own uplink transmissions after WUS detection via at least one of assignment of orthogonal frequency time uplink resources to different UEs, different spatial layers or beams assigned to different UEs, or different spreading codes, root sequences, or cyclic shift values assigned to different UEs.

Embodiment 17

The method of any of Embodiments 11-16, wherein the information regarding uplink resources assigned to the UE is sent by the network entity via at least one of radio resource control (RRC) or media access control (MAC) control element (CE) signaling.

Embodiment 18

The method of any of Embodiments 11-17, wherein the uplink resources assigned to the UE vary.

Embodiment 19

The method of Embodiment 18, wherein the uplink resources assigned to the UE vary depending on the resources used for transmission of the WUS, are indicated by the WUS, or vary according to a frequency hopping pattern.

Embodiment 20

The method of Embodiment 19, wherein the UE determines the uplink resources assigned to the UE based on a mapping of the resources used for transmission of the WUS and uplink resources assigned to the UE.

Embodiment 21

An apparatus for wireless communication by a user equipment (UE), comprising means for obtaining information regarding uplink resources assigned to the UE for an uplink transmission during a wake-up procedure after detecting at least one wake up signal (WUS) during a WUS occasion configured for the UE in a discontinuous reception (DRX) mode, wherein the UE shares uplink resources with one or more other UEs for sending their own uplink transmissions after WUS detection and means for sending the uplink transmission, after detecting the WUS, using the assigned uplink resources.

Embodiment 22

An apparatus for wireless communication by a network entity, comprising means for signaling, to a user equipment, information regarding uplink resources assigned to the UE for an uplink transmission during a wake-up procedure after detecting at least one wake up signal (WUS) during a WUS occasion configured for the UE in a discontinuous reception (DRX) mode, wherein the UE shares uplink resources with one or more other UEs for sending their own uplink transmissions after WUS detection, means for sending the UE a WUS, and means for monitoring the assigned uplink resources for the uplink transmission, after sending the WUS.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 11 and FIG. 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a user equipment (UE), comprising:
  obtaining information regarding uplink resources assigned to the UE for use in transmitting an uplink transmission during a wake-up procedure after detecting at least one wake up signal (WUS) during a WUS occasion configured for the UE in a discontinuous reception (DRX) mode, wherein the UE shares uplink resources with one or more other UEs for sending their own uplink transmissions after WUS detection; and
  sending the uplink transmission, after detecting the WUS, using the uplink resources assigned to the UE, wherein the uplink resources assigned to the UE for use in transmitting the uplink transmission vary depending on downlink resources used for transmission of the WUS.

2. The method of claim 1, wherein the uplink transmission is sent during an ON duration of the DRX mode.

3. The method of claim 1, wherein the uplink transmission is sent to at least one of:
  confirm detection of the WUS;
  provide feedback regarding measurement of one or more reference signals (RS); or
  request one or more types of RS.

4. The method of claim 1, wherein the uplink transmission comprises at least one of:
  sounding reference signals (SRS); or
  UE status reporting.

5. The method of claim 1, wherein the uplink resources assigned to the UE are for a physical uplink control channel (PUCCH) transmission or a physical uplink shared channel (PUSCH) transmission.

6. The method of claim 1, wherein the UE shares uplink resources with the one or more other UEs for sending their own uplink transmissions after WUS detection via at least one of:
  assignment of orthogonal frequency time uplink resources to different UEs;
  different spatial layers or beams assigned to different UEs; or
  different spreading codes, root sequences, or cyclic shift values assigned to different UEs.

7. The method of claim 1, wherein the information regarding uplink resources assigned to the UE is obtained via at least one of radio resource control (RRC) or media access control (MAC) control element (CE) signaling.

8. The method of claim 1, wherein the uplink resources assigned to the UE for use in transmitting the uplink transmission further
vary according to a frequency hopping pattern.

9. The method of claim 1, wherein the UE determines the uplink resources assigned to the UE for use in transmitting the uplink transmission based on a mapping of the resources used for transmission of the WUS and uplink resources assigned to the UE.

10. The method of claim 1, wherein the uplink resources assigned to the UE for use in transmitting the uplink transmission are indicated by the WUS.

11. A method of wireless communication by a network entity, comprising:
   signaling, to a user equipment, information regarding uplink resources assigned to the UE for use in transmitting an uplink transmission during a wake-up procedure after detecting at least one wake up signal (WUS) during a WUS occasion configured for the UE in a discontinuous reception (DRX) mode, wherein the UE shares uplink resources with one or more other UEs for sending their own uplink transmissions after WUS detection;
   sending the UE a WUS; and
   monitoring the uplink resources assigned to the UE for the uplink transmission, after sending the WUS, wherein the uplink resources assigned to the UE for use in transmitting the uplink transmission vary depending on downlink resources used for transmission of the WUS.

12. The method of claim 11, wherein the assigned resources are for the uplink transmission to be sent during an ON duration of the DRX mode.

13. The method of claim 11, wherein the uplink transmission provides at least one of:
   confirmation of detection of the WUS;
   feedback regarding measurement of one or more reference signals (RS); or
   a request one or more types of RS.

14. The method of claim 11, wherein the uplink transmission comprises at least one of:
   sounding reference signals (SRS); or
   UE status reporting.

15. The method of claim 11, wherein the uplink resources assigned to the UE are for a physical uplink control channel (PUCCH) transmission or a physical uplink shared channel (PUSCH) transmission.

16. The method of claim 11, wherein the network entity multiplexes uplink resources for the UE and the one or more other UEs for sending their own uplink transmissions after WUS detection via at least one of:
   assignment of orthogonal frequency time uplink resources to different UEs;
   different spatial layers or beams assigned to different UEs; or
   different spreading codes, root sequences, or cyclic shift values assigned to different UEs.

17. The method of claim 11, wherein the information regarding uplink resources assigned to the UE is sent by the network entity via at least one of radio resource control (RRC) or media access control (MAC) control element (CE) signaling.

18. The method of claim 11, wherein the uplink resources assigned to the UE for use in transmitting the uplink transmission are indicated by the WUS.

19. The method of claim 11, wherein the uplink resources assigned to the UE for use in transmitting the uplink transmission further
vary according to a frequency hopping pattern.

20. The method of claim 11, wherein the UE determines the uplink resources assigned to the UE for use in transmitting the uplink transmission based on a mapping of the resources used for transmission of the WUS and uplink resources assigned to the UE.

21. An apparatus for wireless communication by a user equipment (UE), comprising:
   means for obtaining information regarding uplink resources assigned to the UE for use in transmitting an uplink transmission during a wake-up procedure after detecting at least one wake up signal (WUS) during a WUS occasion configured for the UE in a discontinuous reception (DRX) mode, wherein the UE shares uplink resources with one or more other UEs for sending their own uplink transmissions after WUS detection; and
   means for sending the uplink transmission, after detecting the WUS, using the uplink resources assigned to the UE, wherein the uplink resources assigned to the UE for use in transmitting the uplink transmission vary depending on downlink resources used for transmission of the WUS.

22. An apparatus for wireless communication by a network entity, comprising:
   means for signaling, to a user equipment, information regarding uplink resources assigned to the UE for use in transmitting an uplink transmission during a wake-up procedure after detecting at least one wake up signal (WUS) during a WUS occasion configured for the UE in a discontinuous reception (DRX) mode, wherein the UE shares uplink resources with one or more other UEs for sending their own uplink transmissions after WUS detection;
   means for sending the UE a WUS; and
   means for monitoring the uplink resources assigned to the UE for the uplink transmission, after sending the WUS, wherein the uplink resources assigned to the UE for use in transmitting the uplink transmission vary depending on downlink resources used for transmission of the WUS.

* * * * *